(12) United States Patent
Smith et al.

(10) Patent No.: US 7,808,936 B2
(45) Date of Patent: Oct. 5, 2010

(54) SYSTEMS AND METHODS FOR FACSIMILE ECHO CANCELLATION

(75) Inventors: Robert Smith, Santa Barbara, CA (US); Alan Erringer, Santa Barbara, CA (US)

(73) Assignee: j2 Global Communications, Inc., Hollywood, CA (US)

( * ) Notice: Subject to any disclaimer, the term of this patent is extended or adjusted under 35 U.S.C. 154(b) by 1532 days.

(21) Appl. No.: 11/124,901

(22) Filed: May 9, 2005

(65) Prior Publication Data
US 2006/0250997 A1   Nov. 9, 2006

(51) Int. Cl.
*H04B 3/20* (2006.01)

(52) U.S. Cl. .................. 370/286; 370/218; 370/252; 370/331; 370/352; 455/412.2

(58) Field of Classification Search ................ 358/1.15, 358/402, 434; 370/222, 247, 346, 286, 287, 370/352, 356, 401, 255, 260, 395.54, 218, 370/252, 331; 379/93.09, 100.12, 100.17, 379/406.01, 90.01; 455/420, 455, 557, 412.2; 381/66

See application file for complete search history.

(56) References Cited

U.S. PATENT DOCUMENTS

| | | | |
|---|---|---|---|
| 3,936,613 A | 2/1976 | Nishigori et al. | |
| 3,956,595 A | 5/1976 | Sobanski | |
| 4,009,337 A | 2/1977 | Sakai et al. | |
| 4,022,983 A | 5/1977 | Braun et al. | |
| 4,485,470 A | 11/1984 | Reali | |
| 4,519,081 A | 5/1985 | Sugie | |
| 4,736,405 A | 4/1988 | Akiyama | |
| 4,809,321 A | 2/1989 | Morganstein et al. | |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,216,519 A | 6/1993 | Dagget et al. | |
| 5,291,302 A | 3/1994 | Gordon et al. | |

(Continued)

FOREIGN PATENT DOCUMENTS

CA    1329852    9/1989

(Continued)

OTHER PUBLICATIONS

Johnson, Dave; Article; "Now You're Talking—voice—response systems for home offices—Product Information"; http://www.findarticles.com; Feb. 1999.

(Continued)

*Primary Examiner*—Gerald Gauthier
(74) *Attorney, Agent, or Firm*—Blakely, Sokoloff, Taylor & Zafman, LLP

(57) ABSTRACT

The present invention is related to methods and systems for reducing or canceling echoes during fax communications. In an embodiment, during a fax call, a first fax signal from a first fax device intended for a second fax device is detected. Based at least in part on detecting the first fax signal from the first fax device or on the termination of the first fax signal, an echo audio packet is muted, wherein the echo audio packet is at least partly the result of the first fax signal being transmitted over a network, the network including at least a data network.

87 Claims, 3 Drawing Sheets

U.S. PATENT DOCUMENTS

| | | | |
|---|---|---|---|
| 5,404,537 A | 4/1995 | Olnowich et al. | |
| 5,434,908 A | 7/1995 | Klein | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A | 7/1997 | Dunn et al. | |
| 5,668,861 A | 9/1997 | Watts | |
| 5,751,795 A | 5/1998 | Hassler et al. | |
| 5,761,312 A | 6/1998 | Zelikovitz et al. | |
| 5,774,067 A | 6/1998 | Olnowich et al. | |
| 5,793,755 A * | 8/1998 | Gupta et al. | 370/286 |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,930,727 A * | 7/1999 | Henry, Jr. | 455/557 |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,032,051 A | 2/2000 | Hall et al. | |
| 6,034,956 A | 3/2000 | Olnowich et al. | |
| 6,035,031 A | 3/2000 | Silverman | |
| 6,044,059 A | 3/2000 | Olnowich | |
| 6,075,847 A * | 6/2000 | Leung | 379/100.17 |
| 6,078,581 A | 6/2000 | Shtivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,178,183 B1 | 1/2001 | Buskirk, Jr. | |
| 6,181,691 B1 | 1/2001 | Markgraf et al. | |
| 6,185,195 B1 * | 2/2001 | Leung | 370/286 |
| 6,208,638 B1 | 3/2001 | Rieley et al. | |
| 6,212,261 B1 | 4/2001 | Meubus et al. | |
| 6,230,009 B1 | 5/2001 | Holmes et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,304,565 B1 | 10/2001 | Ramamurthy | |
| 6,310,939 B1 | 10/2001 | Varney | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls et al. | |
| 6,385,195 B2 * | 5/2002 | Sicher et al. | 370/356 |
| 6,405,035 B1 | 6/2002 | Singh | |
| 6,411,601 B1 | 6/2002 | Shaffer et al. | |
| 6,411,805 B1 | 6/2002 | Becker et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,480,585 B1 * | 11/2002 | Johnston | 379/100.17 |
| 6,483,600 B1 | 11/2002 | Schuster et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,539,084 B1 | 3/2003 | Long | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,594,351 B1 | 7/2003 | Bhogal et al. | |
| 6,621,892 B1 | 9/2003 | Banister et al. | |
| 6,643,034 B1 | 11/2003 | Gordon et al. | |
| 6,662,232 B1 | 12/2003 | Nicholls et al. | |
| 6,690,785 B1 | 2/2004 | Stelter et al. | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,785,339 B1 | 8/2004 | Tahernezhaadi et al. | |
| 6,788,651 B1 * | 9/2004 | Brent et al. | 370/255 |
| 6,792,094 B1 | 9/2004 | Kirkpatrick | |
| 6,798,870 B1 | 9/2004 | Lines et al. | |
| 6,801,932 B1 | 10/2004 | Picoult et al. | |
| 6,819,454 B2 * | 11/2004 | Leung | 358/434 |
| 6,857,074 B2 | 2/2005 | Bobo, II | |
| 6,898,275 B2 | 5/2005 | Dolan et al. | |
| 6,920,219 B2 * | 7/2005 | Tahernezhaadi | 379/406.01 |
| 6,928,479 B1 | 8/2005 | Meyer et al. | |
| 6,968,174 B1 | 11/2005 | Trandal et al. | |
| 6,985,722 B1 * | 1/2006 | Snelgrove et al. | 455/420 |
| 7,003,087 B2 | 2/2006 | Spencer et al. | |
| 7,009,961 B2 * | 3/2006 | Pietrowicz et al. | 370/352 |
| 7,230,745 B1 | 6/2007 | Street, Jr. | |
| 7,283,270 B2 | 10/2007 | Boire-Lavigne et al. | |
| 7,286,496 B2 * | 10/2007 | Koide et al. | 370/287 |
| 7,292,582 B2 * | 11/2007 | Kimber et al. | 370/395.54 |
| 7,295,547 B2 * | 11/2007 | Oshima et al. | 370/352 |
| 7,301,933 B1 * | 11/2007 | Baggs et al. | 370/352 |
| 7,333,447 B2 * | 2/2008 | LeBlanc | 370/286 |
| 7,372,833 B2 * | 5/2008 | Kyronaho et al. | 370/331 |
| 7,408,920 B2 * | 8/2008 | Berkley et al. | 370/352 |
| 7,430,179 B2 * | 9/2008 | Towns-von Stauber et al. | 370/252 |
| 7,447,192 B1 * | 11/2008 | Lehto | 370/352 |
| 7,450,561 B2 * | 11/2008 | Strater et al. | 370/352 |
| 7,483,523 B2 * | 1/2009 | Abou-chakra et al. | 379/90.01 |
| 7,505,759 B1 * | 3/2009 | Rahman | 455/412.2 |
| 7,508,753 B2 * | 3/2009 | Greenspan et al. | 370/218 |
| 7,602,704 B2 * | 10/2009 | Shaffer et al. | 370/218 |
| 7,630,320 B2 * | 12/2009 | Zhang et al. | 370/252 |
| 7,706,355 B2 * | 4/2010 | Michalewicz et al. | 370/352 |
| 2002/0001373 A1 * | 1/2002 | Sakurai | 379/100.12 |
| 2002/0010616 A1 | 1/2002 | Itzhaki | |
| 2002/0041391 A1 | 4/2002 | Bannai | |
| 2002/0097710 A1 | 7/2002 | Burg | |
| 2002/0101854 A1 | 8/2002 | Siegrist | |
| 2003/0002476 A1 | 1/2003 | Chung et al. | |
| 2003/0039339 A1 | 2/2003 | Luehrig et al. | |
| 2003/0048484 A1 | 3/2003 | Seki et al. | |
| 2003/0072432 A1 | 4/2003 | Kelly | |
| 2003/0095645 A1 * | 5/2003 | Naudot et al. | 379/93.09 |
| 2003/0123466 A1 | 7/2003 | Somekh et al. | |
| 2003/0156700 A1 | 8/2003 | Brown et al. | |
| 2003/0193696 A1 * | 10/2003 | Walker et al. | 358/402 |
| 2003/0215078 A1 | 11/2003 | Brahm et al. | |
| 2003/0223573 A1 * | 12/2003 | Tahernezhaadi | 379/406.01 |
| 2004/0001221 A1 | 1/2004 | McCallum | |
| 2004/0028203 A1 | 2/2004 | Wurster et al. | |
| 2004/0042031 A1 * | 3/2004 | Abrishami et al. | 358/1.15 |
| 2004/0120510 A1 * | 6/2004 | LeBlanc | 379/406.01 |

| | | |
|---|---|---|
| 2004/0146153 A1 | 7/2004 | Solin |
| 2004/0184096 A1 | 9/2004 | Choi |
| 2004/0190706 A1 | 9/2004 | Fleischer, III et al. |
| 2004/0196833 A1 | 10/2004 | Dahan et al. |
| 2004/0258220 A1 | 12/2004 | Levine et al. |
| 2005/0041643 A1 | 2/2005 | Noguchi et al. |
| 2005/0053216 A1 | 3/2005 | Spencer et al. |
| 2005/0094580 A1* | 5/2005 | Kumar et al. ............... 370/260 |
| 2005/0123118 A1 | 6/2005 | Terry et al. |
| 2005/0153739 A1* | 7/2005 | Halsell ....................... 455/557 |
| 2005/0154599 A1 | 7/2005 | Kopra et al. |
| 2005/0159168 A1* | 7/2005 | Benco et al. ............... 455/455 |
| 2005/0207556 A1 | 9/2005 | Gonzalez et al. |
| 2006/0002403 A1* | 1/2006 | Bettis et al. ................. 370/401 |
| 2006/0013194 A1* | 1/2006 | Baumann et al. ........... 370/352 |
| 2006/0013374 A1 | 1/2006 | Fleischer, III et al. |
| 2006/0072484 A1* | 4/2006 | Qi et al. ...................... 370/286 |
| 2006/0268007 A1 | 11/2006 | Gopalakrishnan |
| 2006/0268831 A1 | 11/2006 | Ulybin |
| 2007/0002077 A1 | 1/2007 | Gopalakrishnan |
| 2007/0013960 A9 | 1/2007 | Gordon et al. |
| 2007/0067738 A1 | 3/2007 | Flynt et al. |
| 2007/0116213 A1 | 5/2007 | Gruchala et al. |
| 2007/0202898 A1 | 8/2007 | Bae et al. |
| 2007/0223053 A1 | 9/2007 | Jin |
| 2007/0223056 A1 | 9/2007 | Arimoto |
| 2007/0223407 A1* | 9/2007 | Engel ......................... 370/286 |
| 2007/0229910 A1 | 10/2007 | Ulybin |
| 2008/0002669 A1* | 1/2008 | O'Brien et al. ............. 370/352 |
| 2009/0067637 A1* | 3/2009 | Gollbach et al. .............. 381/66 |

FOREIGN PATENT DOCUMENTS

| | | |
|---|---|---|
| EP | 1 120 954 | 8/2001 |
| EP | 1120954 | 8/2001 |
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

OTHER PUBLICATIONS

Article: Communications-SMS, Dashboard Widgets—Showcase; http://www.dashboardwidgets.com/showcase/details.php?wid=1082; Oct. 14, 2005; 2 pages.

Article: "Widget MySpace Widget"; posted by 4INFO Bob; http://4info.typepad.com/blog/2006/09/widget_myspace_.html; Sep. 15, 2006; 3 pages.

PCT International Search Report; International Application No. PCT/US06/13060; mailed Nov. 20, 2006.

* cited by examiner

SYSTEMS AND METHODS FOR FACSIMILE ECHO CANCELLATION

BACKGROUND OF THE INVENTION

1. Field of the Invention

The present invention is related to telecommunications, and in particular to echo management or cancellation in an Internet Protocol communications network.

2. Description of the Related Art

The use of Fax over Internet Protocol (FoIP) has become increasing popular. One reason for the increasing popularity of FoIP is the potential for significant reductions in facsimile related costs.

However, certain technical challenges are posed to systems using FoIP. For example, echoes can interfere with FoIP performance. There are several forms and causes of echo in the Public Switched Telephone Network (PSTN). For example, an echo can be caused by poor quality analog and digital telecommunication terminals (handsets, fax machines, etc.). An echo can be caused by background noise of the caller and called party. In addition, an echo can be caused by signal reflections generated by a circuit that converts between a 4-wire circuit, which includes two transmit wires and a 2-wire circuit, that includes one transmit wire and one receive wire.

In many instances, echo is not a very serious problem with a conventional PSTN-based fax communication, as roundtrip delays are typically less than 50 ms. However, echo becomes a serious problem when a packet switched system is used in the communications path, such as in Fax-over-Internet Protocol (FoIP) networks, because the round-trip delay through the network is often greater than 50 ms. This echo interferes with the Fax T.30 and T.4 protocols used by fax machines/servers to establish a call.

SUMMARY OF THE INVENTION

The present invention is related to telecommunications, and in particular to echo management or cancellation in a communications network that includes a data network, such as the Internet.

One embodiment provides a method of canceling echoes associated with fax signaling over a network including at least a data network, during a fax call, the method comprising: during the fax call, detecting a first fax signal from a first fax device intended for a second fax device; detecting the first fax signal from the first fax device and/or the termination of the first fax signal; muting an echo audio packet based at least in part on detecting the first fax signal from the first fax device and/or the termination of the first fax signal, wherein the audio packet is an echo of the first fax signal being transmitted over a network, the network including at least a data network.

Another embodiment provides a fax system, comprising: a data network interface; and a line conditioner system coupled to a data network via the data network interface and further coupled to a fax device, wherein the line conditioner system is configured to detect when a first fax signal is generated by the fax device and/or to detect when the first fax signal terminates, and based at least in part on detecting when the first fax signal is generated and/or when the first fax signal terminates, mute a packet directed to the first fax device and received at the line conditioner circuit via the data network if the packet is received during a selected first period of time.

Still another embodiment provides a method of processing fax signaling carried over a network including at least a data network, the method comprising: monitoring a first fax signal from a first fax system directed to a second fax system; and based at least in part upon the monitoring of the first fax signal from the first fax system, muting an audio packet directed to the first fax system, wherein the audio packet is at least partly the result of the first fax signal being transmitted over a network, the network including at least a data network.

BRIEF DESCRIPTION OF THE DRAWINGS

Exemplary embodiments of an echo cancellation and management system are illustrated in the accompanying drawings, which are for illustrative purposes only. The drawings comprise the following figures, in which like numerals indicate like components.

DETAILED DESCRIPTION OF PREFERRED EMBODIMENTS

The present invention is related to telecommunications, and in particular to echo management or cancellation in a packet communications network. In many conventional FoIP systems echo can be a serious problem, because the round-trip delay through the packet network via which faxes are delivered is often greater than the typical guard window (e.g., 75 ms) used to ignore such echoes, and hence the echo may be interpreted by a fax system involved in the fax communication (e.g., a receiving fax server or fax machine) as an error condition. Upon determining that the echo is an error condition, the fax system may drop the call. As will be described below with respect to certain example embodiments, echo cancellation and management processes are provided to avoid such dropped calls. For example, in one embodiment a packet network latency is estimated, and using that estimate, a mute period and/or start time is determined, wherein a fax signal echo (e.g., the echo can be of a fax handshaking signal) is anticipated. An audio signal is selectively muted during the mute period to thereby prevent the echo from being received by the fax system.

While the following description relates to an embodiment utilizing the Internet and related protocols, other networks other protocols may be used as well. Further, while certain protocols, such as IP and RTP, and standards, such as T.37 and T.38, are referred to, the present invention is not limited to use with these protocols and standards, or with any particular version of these protocols or standards.

The functions described herein are optionally performed by executable code and instructions stored in computer readable memory and running on one or more computers equipped with networking devices. However, the present invention can also be implemented using state machines, signal processing chips, and/or hardwired electronic circuits. Further, with respect to the example processes described herein, not all the process states need to be reached, nor do the states have to be performed in the illustrated order. Further, certain process states that are described as being serially performed can be performed in parallel, and certain processes that are described as being performed in parallel can be performed serially.

Figure 1:
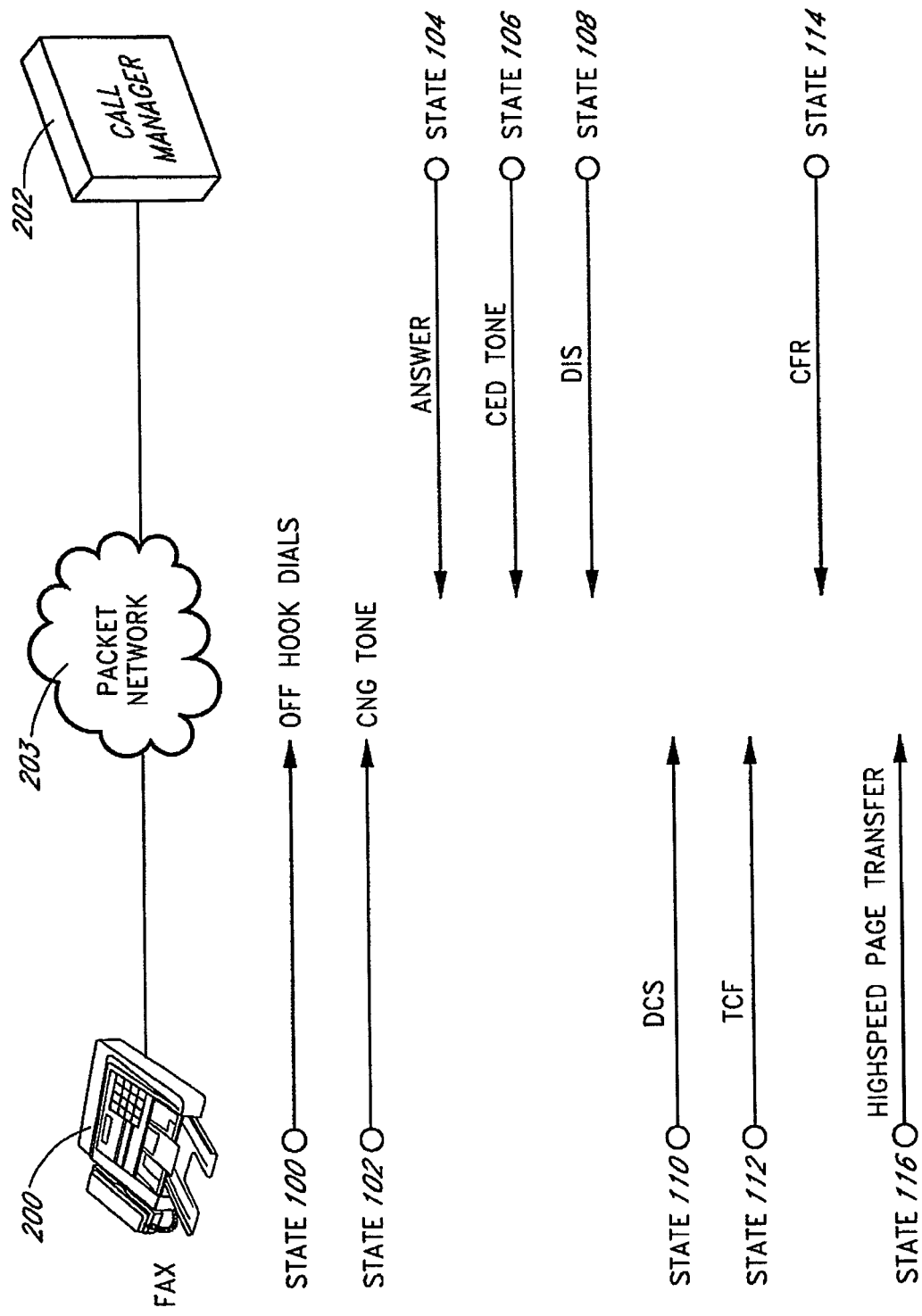
FIG. 1 illustrates an example FoIP system and a fax call process.

An example sequence of establishing a fax call is described below and shown in FIG. 1. This example includes a fax machine 200 that communicates with a call manager 202 over a network 203, such as the Internet or other packet network. The call manager 202 optionally includes a fax server capable of originating or receiving voice and/or fax calls over PSTN or Internet Protocol (IP) networks, and so the call manger 202 will sometimes be referred to as fax server 202. However, rather than using a server-based system, optionally, the call manager is or includes a conventional or other type of fax machine or fax receiver.

The fax server 202 is optionally compatible with one or more FoIP-related standards, such as the real-time network standard (T.38) and the store-forward FoIP network standard (T.37). The fax server 202 can optionally be connected directly to a packet network, such as the Internet, via a network interface circuit, and can transmit media streams via real time protocol (RTP) packets.

The fax machine 200 and/or the fax server 202 optionally include modems, such as high speed modems, used to transmit fax data. The modem converts digital data generated by the fax machine or fax server into analog signals for transmission over analog lines.

Figure 3:
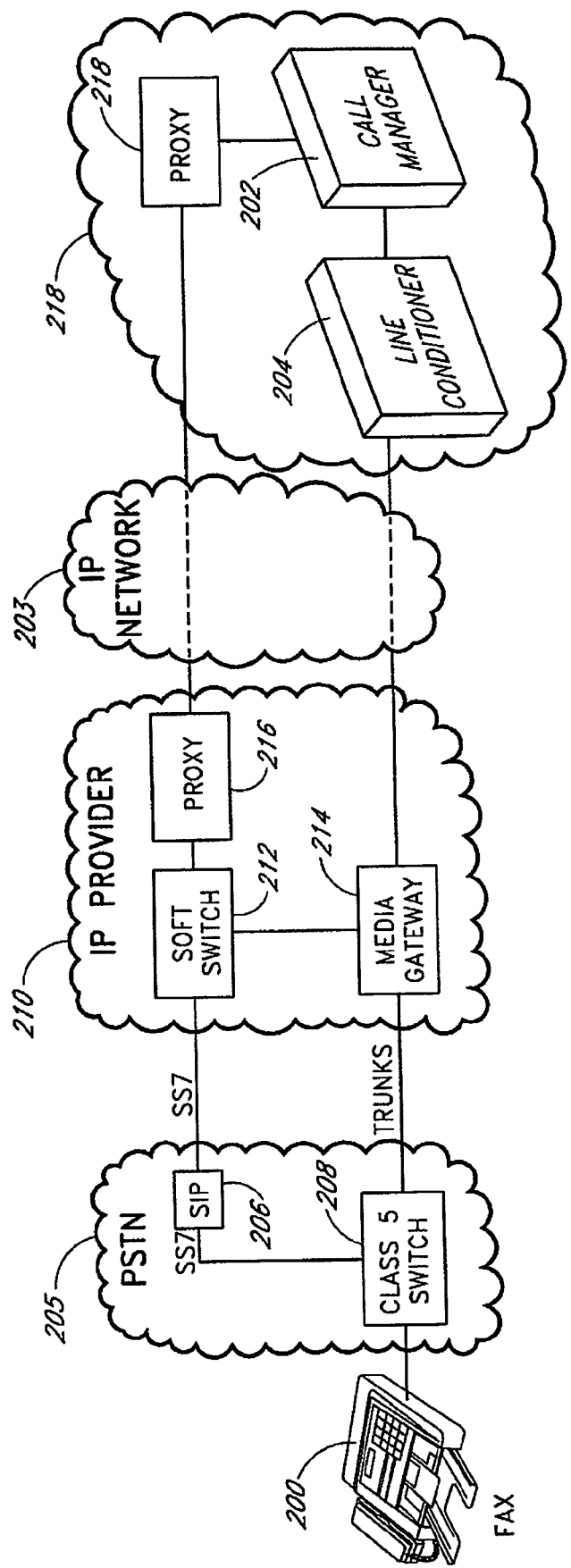
FIG. 3 illustrates another example FoIP system.

The fax machine 200 can be optionally coupled to a Media Gateway (MG) over the PSTN as shown in FIG. 3. A MG enables the transmission of combined voice and data over the packet network. The MG converts an incoming circuit-switched call into digital data for transmission over the packet network (e.g., IP network) and reconverts digital data directed to the fax machine 200 to a circuit-switched call. A fax server can similarly be coupled to a FoIP MG.

At state 100, fax machine 200 places a call which is directed to the fax server 202. The call can be manually placed by a human user at fax machine 200 initiating a call (e.g., by dialing a corresponding number, by selecting a name from an electronic directory, or otherwise) to the call manager or fax server 202 and placing fax machine 200 into fax mode, or the call can be placed automatically, without human interaction. The answering fax machine or fax server 202 answers the call at state 104 and returns an answer tone (e.g., a CallEd station Identification (CED)) at state 106. For example, the CED can be a tone at a predetermined frequency, such as 2.1 kHz, such as is generated by a receiving Group 3 fax machine.

If the call is automatically dialed, the fax machine 200 will also indicate the fax call with a calling tone (CNG) at state 102, which can be a short, periodic tone that begins immediately after the number is dialed. These tones can be used to allow a human participant to realize that a machine, such as a fax machine, is present on the other end of the call.

The control and capabilities exchange (CCE) phase of the fax call is used to identify the capabilities of the fax machine at the other end of the call. During the CCE phase, the communicating devices (e.g., two fax machines or a fax machine and a call manager) also negotiate the acceptable conditions for the call. The exchanges of control messages during the fax call are optionally sent using a rate that most fax machines support, such as by using the low-speed (300 bps) modulation mode in a half-duplex mode (one talker at a time). A control message is preceded by a preamble, such as a one-second preamble, which allows the communication channel to be conditioned for reliable transmission.

At state 108 the called fax server 202 starts the process by sending a Digital Identification Signal (DIS) message, which contains the capabilities of the fax server 202. An example of a capability that could be identified in this message is the support of the V.17 (14,000 bps) data signaling rate. At this time, the called subscriber information (CSI) and NonStandard Facilities (NSF) messages are optionally also sent. NSF are capabilities or enhancements that a particular fax manufacturer has built into a fax machine.

Once the calling fax machine 200 receives the DIS message, the fax machine 200 determines the conditions for the call by examining its capabilities table. The calling fax machine 200 responds at state 110 with the Digital Command Signal (DCS), which defines the conditions of the call. For example, the DCS can inform the fax server 202 which capabilities were selected and can lock the receiving unit into the fax server 202 into the selected capabilities.

At this stage, high-speed modem training begins. The high-speed modem is used to transfer page data and converts digital data into analog signals for transmission over analog lines. The calling fax machine 200 at state 112 sends a Training Check Field (TCF) through the modulation system to verify the training and to ensure that the channel is suitable for transmission at the accepted data rate. The called fax server 202 responds at state 114 with a confirmation to receive (CFR) signal, which indicates that capabilities and the modulation speed have been confirmed and that the fax page may be sent.

The confirming CFR sent from the fax server 202 is received by the fax machine 200, but enough of the signal may bounce or reflect off the far end as echo to interfere with the initial burst of fax data representing the first fax page (e.g., the first fax page of scanned in and compressed data), which begins at state 116.

In the Public Switched Telephone Network, latency is low enough that an echo is ignored during a standard 75 ms guard window after sending of the CFR from the fax server 202. However, in a FoIP environment, latency from 80-120 ms causes enough of a time shift that the signal echo arrives after the guard window of 75 ms. When the echo arrives at the receiving fax server 202, the fax server 202 has changed state and is now listening for the first page of the fax. The echo CFR is not the fax data (V.29 signal) the fax server 202 expects, and so the echo may be interpreted as an error condition, whereupon the fax server 202 may prematurely drop the call.

Figure 2:
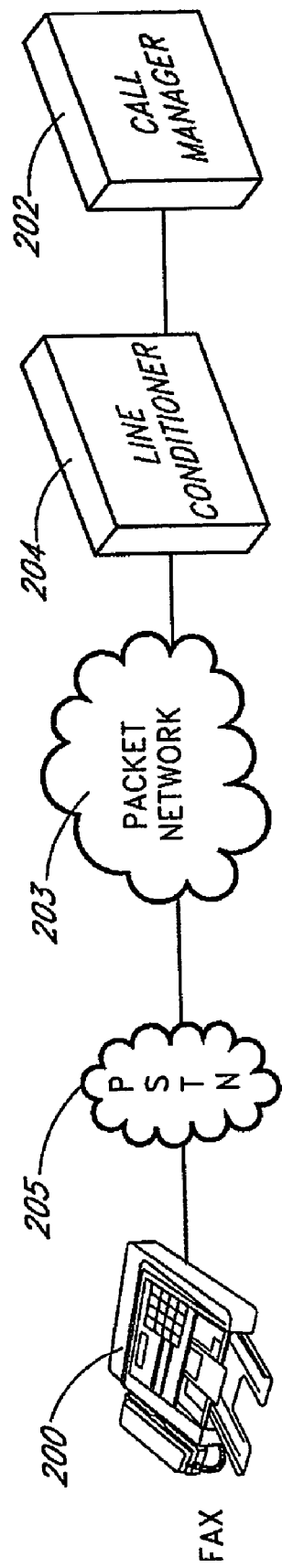
FIG. 2 illustrates another example FoIP system.

Optionally, to reduce or eliminate dropped calls as a result of an echo CFR, the call manager 202 includes or is coupled to an echo management or cancellation line conditioner system 204. For example, the echo cancellation can be performed by software executing on the call manager fax server 202, or can be dedicated hardware (e.g., a digital signal processor-based system). In another embodiment, an example of which is illustrated in FIGS. 2 and 3, the call manager 202 is coupled to an echo cancellation line conditioner system placed in the path between the call manager 202 and the fax machine 200. An example embodiment of an echo cancellation line conditioner system will be discussed in greater detail below.

FIG. 2 illustrates an example embodiment, wherein the echo cancellation line conditioner system 204 is placed in the path between the call manager 202 and the fax machine 200. The fax machine 200 is coupled to the packet network 203 via the PSTN 205.

The echo cancellation line conditioner system 204 can include a server. The echo cancellation line conditioner system 204 conditions the network path in a FoIP environment in order to eliminate the echo which would otherwise cause a fax call to be dropped, or to reduce the echo so that it does not result in dropped calls. The echo cancellation line conditioner system server 204 can be a server separate from the call manager server 202, or the server 204 can be a software application hosted in the call manager server 202.

The echo cancellation line conditioner system server 204 monitors the Real Time Protocol (RTP) media stream from the fax server 202 for outbound audio (e.g., by detecting which packets have associated audio energy. If audio is detected originating from the fax server 202, then after a delay (e.g., a predetermined delay or a variable window), the server 204 mutes the inbound audio signal from the original sending fax machine 200 (or in this case, the echo signal reflected back from the fax machine 200 or the path thereto, that appears to be an inbound signal from fax machine 200). By way of example, the muting process can be performed by suppressing the outbound audio packets, and/or the audio packets can be substituted with silence audio packets (e.g., audio packets having no or a very low associated audio volume).

The delay can be set or selected to correspond to an estimated network latency, such as a measured packet network path latency with respect to one or more paths between the fax server 202 and the fax machine 200. The estimated latency can optionally also include PSTN and other path latencies. By way of example, the delay can be 80 ms, 90 ms, 100 ms, 110 ms, 120 ms, 130 ms or other appropriate delay time. In one embodiment, several measurements are taken of IP network path latencies, and the average latency, or other statistical latency estimation, is used to determine the delay. When the server 204 detects the termination of the outbound audio signal (e.g., by detecting the lack of speech energy or silence) from fax server 202, the server 204 waits the selected or set delay period and then opens the audio path to the original sending fax machine 200. Optionally, instead, or in addition, the delay period can be based on when the audio was generated by the server 204.

In this example, the server 204 is in the network IP path for the duration of the fax call. The subsequent fax call states including page transfer, end of page and multipage signaling, and call release, are performed as appropriate.

One or more processes can be utilized to measure latencies, such as the latencies in IP or other packet networks over which the FoIP communication will be performed, wherein the latency measurements can be used to set the delay after which a the server 204 mutes the audio signal. For example, an ICMP (Internet Control Message Protocol) Echo Request packet, also known as a ping, is transmitted directly from the fax server 202 to the target (e.g., the media gateway where the inbound fax call is converted from a PSTN call to a VoIP call) to be tested. The target, upon receipt of the ICMP Echo Request, builds a corresponding ICMP Echo Reply packet and transmits it back to the fax server that sent the Echo Request. The time between the transmittal of the Echo Request and the receipt of the Echo Reply will provide the fax server with an indication of the communication latency. Optionally, a traceroute (tracert) routine can also provide an approximation of the latency.

Latency can be measured using still other processes. For example, a Test TCP (TTCP) utility can be used to measure TCP (transmission control protocol), or UDP (user datagram protocol) throughput through the IP path between the fax server 202 and\the media gateway where the inbound fax call is converted from a PSTN call to VoIP. The fax server 202 sends a specified number of TCP (or UDP) packets to the media gateway. At the end of the test, the two sides provide the number of bytes transmitted and the time elapsed for the packets to pass from one end to the other. These figures can be used to calculate the actual or estimated throughput and latency on the link. Other tools, such as pchar, can also be used to measure latency and throughput.

By way of further example, test calls can be placed from a fax server via the PSTN to the fax machine phone number. The call routes through the IP network and terminates at the fax machine. When the call is connected, tones (e.g., fax handshaking tones or DTMF tones) can be exchanged. The timing of this exchange, which is the time between a sent tone and receipt of a reply tone, gives an estimated measure of the latency.

FIG. 3 shows a more detailed description of example components used in an example integrated PSTN and IP network. The fax machine 200 is coupled to the PSTN 205 via a Class 5 switch 208. The Class 5 Switch 208 is communicates with a Session Initiation Protocol (SIP) component 206 using the SS7 signaling protocol. SIP is a signaling protocol which can be used for Internet conferencing, telephony, presence, events notification and instant messaging, by way of example. The SIP component is coupled to a soft switch 212 of an IP provider 210 and communicates via SS7 signaling. The soft switch 112 manages the service logistics of the traffic between the IP provider 210 and the PSTN 205. The soft switch is coupled to a media gateway 214 which converts circuit-switched voice to packet-based traffic. The media gateway 214 is coupled to the PSTN 205 via one or more trunks.

As can be seen in this figure, the line conditioning functions performed by server 204 pertain to the RTP streams communicated over the path between the call manager 202 and the media gateway 214. Optionally, the server 204 does not perform echo cancellation for the signaling between the Call Manager 202 and SIP proxy 218.

The soft switch 210 is further coupled to a proxy 216. The proxy 216 is coupled via an IP or other packet network 203 to the SIP proxy 218 associated with a call processing system 220. The media gateway 214 is coupled to the line conditioner 204 over the network 203. The call manager (including the fax server) 204 is coupled to the proxy 218 and the line conditioner 204.

Although this invention has been described in terms of a simple and preferred embodiment, other embodiments that are apparent to those of ordinary skill in the art are also within the scope of this invention. For example, the conditioning server 204 could automatically adapt the echo suppression by correlating the outbound signal with the return signal. In another embodiment, the conditioning server could listen for and mute only specific frequencies based on the state of the call and the audio signal generated by the fax server 202.

What is claimed is:

1. A method of canceling echoes associated with fax signaling over a network including at least a data network, during a fax call, the method comprising:
    during the fax call, detecting a first fax signal from a first fax device and/or the termination of the first fax signal, wherein the first fax signal is intended for a second fax device;
    muting an echo audio packet based at least in part on detecting the first fax signal from the first fax device and/or the termination of the first fax signal, wherein the audio packet is an echo of the first fax signal being transmitted over a network, the network including at least a data network.

2. The method as defined in claim 1, wherein the audio packet is in a real time protocol stream.

3. The method as defined in claim 1, wherein the data network is the Internet.

4. The method as defined in claim 1, wherein the muting is performed by intercepting the audio packet, and preventing the audio packet from reaching the first fax device.

5. The method as defined in claim 1, wherein the muting is performed at least in part by intercepting the echo audio packet, and substituting the echo audio packet with an audio packet corresponding to silent audio.

6. The method as defined in claim 1, wherein the first fax device is a fax server.

7. The method as defined in claim 1, wherein the second fax device is a dedicated fax machine.

8. The method as defined in claim 1, wherein the muting is performed at least 80 ms after termination of the first fax signal.

9. The method as defined in claim 1, wherein the muting is performed within a window beginning at least 80 ms after termination of the first fax signal, and ending 120 ms after termination of the first fax signal.

10. The method as defined in claim 1, wherein the muting is performed during a window period selected based at least in part on a plurality of network latency measurements.

11. The method as defined in claim 1, wherein the muting is performed during a window period selected based at least in part on network latency for at least a portion of the network between the first fax device and the second fax device.

12. The method as defined in claim 1, further comprising measuring network latency.

13. The method as defined in claim 1, further comprising measuring network latency using one or more of a ping, a test TCP operation, or a tone exchange.

14. The method as defined in claim 1, wherein the echo audio packet results from a confirmation to receive (CFR) signal echo, being an echo of a CFR signal from the first fax device.

15. The method as defined in claim 1, wherein the second fax device is coupled to a gateway that converts a circuit switched call into digital data for transmission over the data network.

16. The method as defined in claim 1, wherein the first fax device is coupled directly to the data network via a network interface circuit.

17. The method as defined in claim 1, wherein the second fax device initiates the fax call to the first fax device.

18. A fax system, comprising:
a data network interface; and
a line conditioner system coupled to a data network via the data network interface and further coupled to a fax device, wherein the line conditioner system is configured to detect when a first fax signal is generated by the fax device and/or to detect when the first fax signal terminates, and based at least in part on detecting when the first fax signal is generated and/or when the first fax signal terminates, mute a packet directed to the first fax device and received at the line conditioner circuit via the data network if the packet is received during a selected first period of time.

19. The fax system as defined in claim 18, wherein the fax device is a fax server or a dedicated fax machine.

20. The fax system as defined in claim 18, wherein the line conditioner system further comprises a server.

21. The fax system as defined in claim 18, wherein the line conditioner system mutes the packet by preventing the packet from reaching the fax device.

22. The fax system as defined in claim 18, wherein the packet is an audio packet resulting from an echo of the first fax signal.

23. The fax system as defined in claim 18, further comprising a gateway coupled to the line conditioner system, wherein the gateway converts digital data from the line conditioner system to a circuit-switched call.

24. The fax system as defined in claim 18, wherein the first period of time begins at least 80 ms after the first signal is generated.

25. The fax system as defined in claim 18, wherein the first period of time is at least 40 ms long.

26. The fax system as defined in claim 18, wherein the first fax signal is a confirmation to receive (CFR) signal.

27. The fax system as defined in claim 18, wherein the first fax signal is a handshaking signal directed to a second fax device.

28. The fax system as defined in claim 18, further comprising the fax device.

29. A method of processing fax signaling carried over a network including at least a data network, the method comprising:
monitoring a first fax signal from a first fax system directed to a second fax system; and
based at least in part upon the monitoring of the first fax signal from the first fax system, muting an audio packet directed to the first fax system, wherein the audio packet is at least partly the result of the first fax signal being transmitted over a network, the network including at least a data network.

30. The method as defined in claim 29, wherein the audio packet is in a real time protocol stream.

31. The method as defined in claim 29, wherein the data network is the Internet.

32. The method as defined in claim 29, wherein the muting is performed by a line conditioner system that receives the audio packet, and prevents the audio packet from being received by the first fax system.

33. The method as defined in claim 29, wherein the muting is performed at least in part by receiving the audio packet before it is received by the first fax system, and substituting the audio packet with another packet.

34. The method as defined in claim 29, wherein the first fax system includes a fax server and/or a dedicated fax machine.

35. The method as defined in claim 29, wherein the muting is performed at least 80 ms after the first fax signal is generated.

36. The method as defined in claim 29, wherein the fax signal is a handshaking signal transmitted by the first fax system prior to the second fax system transmitting an initial fax page in a fax call associated with the first fax signal.

37. The method as defined in claim 29, wherein timing for the muting of the audio packet is selected based at least in part on a plurality of network latency measurements.

38. The method as defined in claim 29, wherein timing for the muting of the audio packet is selected based at least in part on network latency for at least a portion of the network between the first fax system and the second fax system.

39. The method as defined in claim 29, further comprising: measuring network latency, and using the measured network latency to determine muting timing.

40. The method as defined in claim 29, further comprising:
measuring network latency using one or more of a ping, a test TCP operation, or a tone exchange; and
using the measured network latency to determine muting timing.

41. The method as defined in claim 29, wherein the audio packet is the result of an echo of the first fax signal.

42. The method as defined in claim 29, wherein the second fax system is coupled to a gateway that converts a circuit switched call into digital data for transmission over the data network.

43. The method as defined in claim 29, wherein the first fax system is coupled directly to the data network via a network interface circuit.

44. A method of canceling echoes associated with fax signaling over a network including at least a data network, the method comprising:
during a fax call, detecting a first fax signal from a first fax device intended for a second fax device;

muting an audio packet based at least in part on detecting the first fax signal from the first fax device and/or termination of at least one fax signal, wherein the audio packet includes an echo of the at least one fax signal being transmitted over a network, the network including at least a data network.

45. The method as defined in claim 44, wherein the audio packet is in a real time protocol stream.

46. The method as defined in claim 44, wherein the data network is an Internet Protocol network.

47. The method as defined in claim 44, wherein the second fax device is configured to participate in a fax call over an Internet Protocol (IP) network.

48. The method as defined in claim 44, wherein the second fax device is configured to participate in a fax call over a switched telephone network.

49. The method as defined in claim 44, wherein the second fax device is configured to participate in a voice call over a switched telephone network.

50. The method as defined in claim 44, wherein the muting is performed by intercepting the audio packet, and preventing the audio packet from reaching the second fax device.

51. The method as defined in claim 44, wherein the muting is performed at least in part by intercepting the audio packet, and substituting the audio packet with a different audio packet corresponding to silent audio.

52. The method as defined in claim 44, wherein the second fax device is a voice and fax processing system.

53. The method as defined in claim 44, wherein the muting is performed during a period selected based at least in part on a plurality of network latency measurements.

54. The method as defined in claim 44, wherein the wherein the muting is performed during a period selected based at least in part on network latency for at least a portion of the network between the first fax device and the second fax device.

55. The method as defined in claim 44, further comprising measuring network latency.

56. The method as defined in claim 44, further comprising measuring network latency using a ping, a test TCP operation, and/or a tone exchange.

57. The method as defined in claim 44, wherein the second fax signal is a confirmation to receive (CFR) signal.

58. The method as defined in claim 44, wherein the audio packet results from a confirmation to receive (CFR) signal echo.

59. The method as defined in claim 44, wherein the at least one fax signal is a training-related signal.

60. The method as defined in claim 44, wherein the first fax device is coupled to a gateway that converts a circuit switched call into digital data for transmission over the data network.

61. The method as defined in claim 44, wherein the second fax device is coupled directly to the data network via a network interface circuit.

62. The method as defined in claim 44, wherein the first fax device initiates the fax call to the second fax device.

63. A line conditioner system, comprising:
a first interface configured to communicate data via a data network; and
a second interface configured to communicate with one or more fax devices,
wherein the line conditioner system is configured to detect at least one fax signal generated by at least one fax device and/or to detect the termination of at least one fax signal, wherein the at least one fax signal is transmitted at least in part over the data network, and based at least in part on such detection, to mute at least one packet directed to at least one fax device, wherein the at least one packet is received at the line conditioner system via the data network.

64. The line conditioner as defined in claim 63, wherein the line conditioner system further comprises a network server.

65. The line conditioner as defined in claim 63, wherein the data network is an Internet Protocol network.

66. The line conditioner as defined in claim 63, wherein the line conditioner system mutes the packet by preventing the packet from reaching the at least one fax device.

67. The line conditioner as defined in claim 63, wherein the packet is an audio packet resulting from an echo of the at least one fax signal.

68. The line conditioner as defined in claim 63, further comprising a gateway, wherein the gateway converts digital data from the line conditioner system to a circuit-switched call.

69. The line conditioner as defined in claim 63, wherein the at least one fax signal is a confirmation to receive (CFR) signal.

70. The line conditioner as defined in claim 63, wherein the at least one fax signal is a handshaking signal directed to a first fax device.

71. The line conditioner as defined in claim 63, further comprising the at least one fax device.

72. The line conditioner as defined in claim 63, wherein the muting is performed during a period selected based at least in part on a plurality of network latency measurements.

73. The line conditioner as defined in claim 63, wherein the muting is performed at least in part by intercepting an audio packet, and substituting the audio packet with an audio packet corresponding to silent audio.

74. A method of processing fax signaling over a network including at least a data network, the method comprising:
monitoring a fax signal from a first fax system directed to a second fax system; and
based at least in part upon the monitoring of the fax signal from the first fax system, muting an audio packet that would otherwise be received by the first fax system, wherein the audio packet is at least partly the result of the fax signal being transmitted over a network, the network including at least a data network.

75. The method as defined in claim 74, wherein the audio packet is in a real time protocol stream.

76. The method as defined in claim 74, wherein the data network is an Internet Protocol network.

77. The method as defined in claim 74, wherein the muting further comprises:
receiving the audio packet at a line conditioner system; and
preventing the audio packet from being received by the first fax system.

78. The method as defined in claim 74, wherein the muting is performed at least in part by receiving the audio packet before it is received by the first fax system, and substituting the audio packet with another packet.

79. The method as defined in claim 74, wherein the muting is performed 80 ms or more after the fax signal is generated.

80. The method as defined in claim 74, wherein the fax signal is a handshaking signal transmitted by the first fax system prior to the second fax system transmitting an initial fax page in a fax call associated with the fax signal.

81. The method as defined in claim 74, wherein timing for the muting of the audio packet is selected based at least in part on a plurality of network latency measurements.

82. The method as defined in claim 74, wherein timing for the muting of the audio packet is selected based at least in part on network latency for at least a portion of the network between the first fax system and the second fax system.

83. The method as defined in claim 74, further comprising:
measuring network latency; and
using the measured network latency to determine muting timing.

84. The method as defined in claim 74, further comprising:
measuring network latency using one or more of a ping, a test TCP operation, or a tone exchange; and
using the measured network latency to determine muting timing.

85. The method as defined in claim 74, wherein the audio packet is the result of an echo of the fax signal.

86. The method as defined in claim 74, wherein the second fax system is coupled to a gateway that converts a circuit switched call into digital data for transmission over the data network.

87. The method as defined in claim 74, wherein the first fax system is coupled directly to the data network via a network interface circuit.

* * * * *